Feb. 21, 1956    A. DE LORENZO    2,735,402
VARIABLE CAPACITY POULTRY TROUGH
Filed Dec. 6, 1952    2 Sheets-Sheet 1
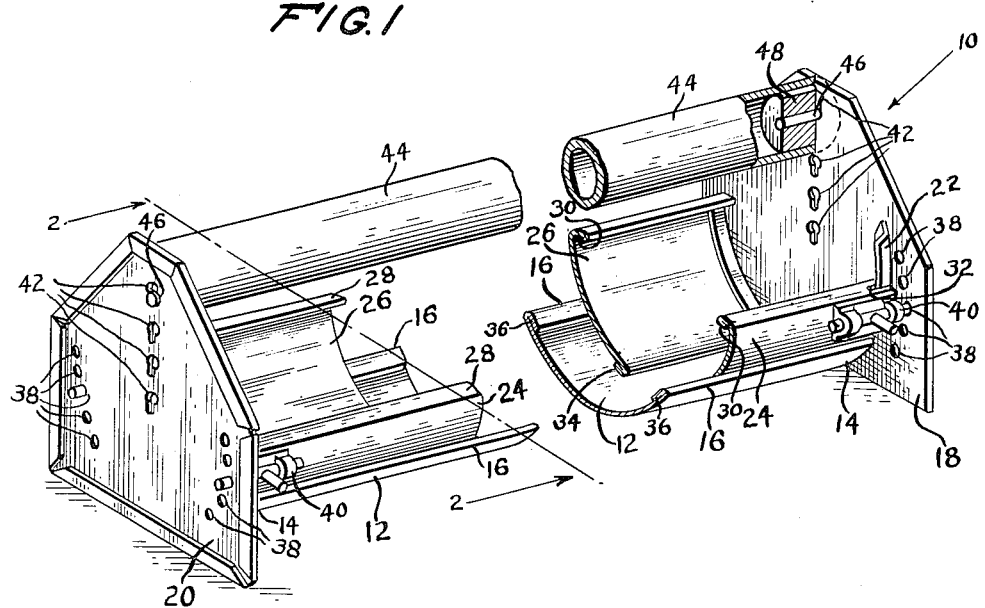
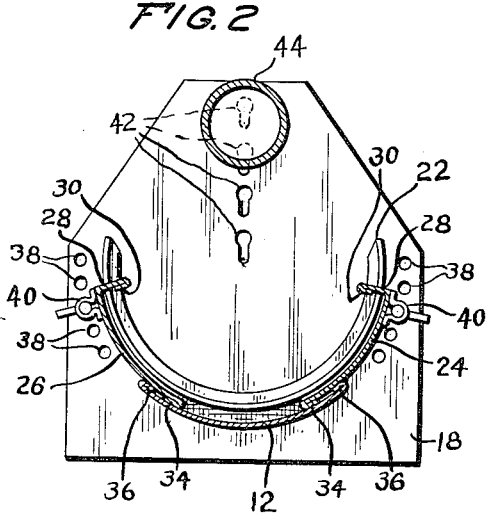
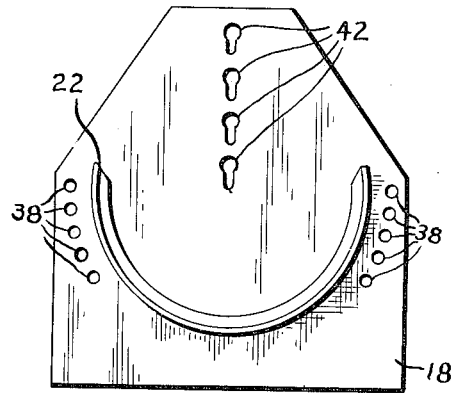
INVENTOR
ANTHONY DeLORENZO
BY Walter J Kreske
ATTORNEY Feb. 21, 1956  A. DE LORENZO  2,735,402
VARIABLE CAPACITY POULTRY TROUGH
Filed Dec. 6, 1952  2 Sheets-Sheet 2

INVENTOR
ANTHONY De LORENZO
BY Walter J. Kreske
ATTORNEY

United States Patent Office 2,735,402
Patented Feb. 21, 1956

2,735,402

VARIABLE CAPACITY POULTRY TROUGH

Anthony De Lorenzo, Duxbury, Mass.

Application December 6, 1952, Serial No. 324,529

5 Claims. (Cl. 119—61)

This invention relates to poultry feeders.

A criticism of many of the existing poultry feeders is that they are overly complicated and entail too expensive a construction for the function they perform. Also, in those feeders where the construction has been simplified, such simplification has usually been achieved at the expense of efficiency in poultry feeding. For example, where a large number of poultry are being serviced, it is desirable to have poultry feeders which may be arranged end to end in several rows to have an embodied construction wherein a workman can walk between two such rows and load both rows of feeders. With many feeders currently in use, this is not possible because their construction permits loading from one side only. In such case the workman must load only one row at a time. Such single row loading requires an increased amount of traveling and time by the workman with its consequent increased expense and decreased operational efficiency.

It also becomes desirable that a feeder be so constructed that it may be loaded in a single operation and still permit poultry to feed from both sides of the feeder at the same time. Such dual feeding construction permits easier accessibility to the feeding poultry as well as the simultaneous feeding of double the number of birds from the same trough. Existing poultry feeders which permit feeding from both sides usually require loading on both sides which means the reduced efficiency of a two operational loading problem.

In breeding poultry, particularly large numbers of poultry, it is desirable that the feeder be adjustable to both small and large birds so that regardless of poultry growth, the same feeder by corresponding adjustment may continually be used. Existing poultry feeders do in general have some sort of adjusting arrangement to accommodate birds of various sizes. However, the adjusting arrangement in existing poultry feeders is confined to that of height only. That is, adjustments may be made to raise or lower the feeder with respect to a reference base. Existing feeders fail to provide for an automatic adjustment of the quantity of food in the trough to accommodate the increasing consuming capacity of birds as they grow. Usually in existing feeders the trough has a fixed capacity which remains the same when the poultry is small as it is after the poultry has grown to full size. Since such a trough must have sufficient capacity to accommodate full grown birds, its capacity for small chicks is much too great. To fill the trough when the chicks are small would mean the food would remain in the trough for extended periods of time and would tend to thereby become contaminated and unsanitary. For that reason when the chicks are small it is customary for the workman to reduce the quantity of food placed in the trough. Such reduction is done by rule of thumb methods or by additional measuring means which is time consuming and again not conducive to maximum operating efficiency.

Pursuant to the present invention, the above and other difficulties have been overcome in an improved poultry feeder which is relatively simple and inexpensive to fabricate, easy to clean and maintain in sanitary condition and easy to operate.

The above and other features are achieved generally by providing a trough having two ends and two sides, an end plate fixed to each end of the trough, an elongated member rotatively mounted at each of its ends in the respective end plates and substantially centrally above the trough, guide members fixed to the end plates in opposed relation to each other and extending upwardly from the trough, and a side wall at each side of the trough mounted to slide on the guide members, and means for locking each of the sides in place at a selected position of extension from the side of the trough thereby determining the effective capacity of the trough simultaneously with the height of the trough. As the sides are extended the capacity increases in proportion to the increase in height. Thus, as the sides are extended to increase the height to accommodate larger birds the capacity of the trough is thereby also automatically increased to accommodate the increased capacity of the larger birds.

By making the trough in the form of a section of a cylinder, food tends to remain central of either side of the trough so that birds from both sides have equal access to the food in the trough. By making the side walls also of cylindrical construction and guide members of similar construction, adjustments for varying sizes of poultry is facilitated as well as adjustment automatically for food capacity of the trough to accommodate the size of poultry is achieved. As the side walls are extended they move outwardly and upwardly. In moving outwardly they not only increase the capacity of the trough but also require the poultry to stand further away from the center of the trough. Since such extension is made as the size of the poultry increases, the poultry being larger can still reach the center of the trough from either side. But the adjustment is such preferably that the poultry can not reach substantially beyond the center of the trough and thereby can not interfere with poultry feeding from the other side of the trough. Thus, poultry can feed unmolested from both sides of the trough which insures a maximum feeding capacity for a given trough made in accordance with the invention.

By providing perforations at spaced intervals substantially centrally above the trough and rotatively mounting an elongated member at its ends in these perforations, a very simple construction for keeping poultry out of the trough for any given height of side wall adjustment is achieved.

By providing a series of perforations in arcuate extension of the cross section of the trough and a bolt latch at each end of the side walls in manner to align with the respective perforations a very simple arrangement for adjusting these side walls to selected heights and locking the side walls in place is achieved.

These and other features, objects and advantages of my invention will be more clearly understood from the following description of an embodiment of my invention taken in connection with the accompanying drawings wherein:

Fig. 1 is an isometric view of a preferred embodiment of my invention sectioned to more clearly show construction.

Fig. 2 is a view taken on line 2—2 of Fig. 1.

Fig. 3 is a view of an end wall member with the adjustment perforations and an arcuate guide member fixed thereto.

Figure 4:
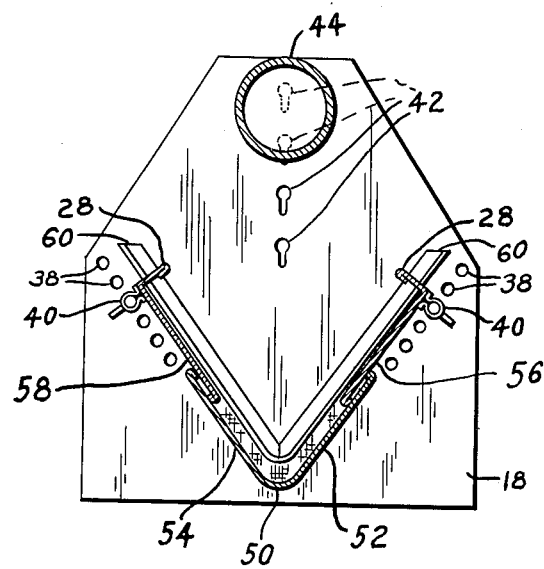
Fig. 4 is a cross sectional view showing a V type trough construction.

Referring to the drawings in more detail, the feeder designated generally by the numeral 10 has a cylindrical trough member 12 having two ends 14 and two sides 16.

The ends of the cylindrical trough member 12 are fixed as by braising, soldering, welding or otherwise fastening to the end wall members or plates 18 and 20 respectively. Likewise fastened to the end walls 18 and 20 are guide members 22 of arcuate shape extending outwardly and upwardly from the cylindrical trough member 12. By referring to Figure 2 it will be seen that the guide member 22 is above the cylindrical trough member 12 and has a diametral dimension slightly smaller than that of the cylindrical trough member 12. Extending from each of the sides 16 of the cylindrical trough member 12 are cylindrical side members 24 and 26 respectively. The upper sides of the side members 24 and 26 have inwardly projecting shoulders 28 which serve several functions. One of their functions is to make it more difficult for poultry food to be spilled from the feeder. Together with the curled over ends 30, another function of the shoulders 28 is to avoid sharp edges which may injure poultry. Still another function is in conjunction with a slot 32 at each of the ends to provide a relatively simple and effective construction for sliding on the guide members 22. In conjunction with the guide members 22, it will be noted that the bottom side of each of the cylindrical side members 24 and 26 has a reverse fold 34 which is opposed to a fold 36 at either side of the cylindrical trough member 12 (Fig. 2). Also, the ends of the cylindrical side members 24 and 26 extend underneath the projecting portion of the guide members 22. Thus, extending adjustments of the cylindrical side members 24 and 26 are limited by the folds 34 and 36. Swinging movement of the cylindrical side members 24 and 26 is prevented by confinement between the projection on the guide members 22 and the cylindrical trough member 12. By the provision of a series of perforations 38 as a substantially arcuate extension of a cross section of the cylindrical trough member 12 and bolt latches 40 fixed to the cylindrical side members 24 and 26, the side members 24 and 26 may be locked in place at selected increments of height adjustment. Other perforations 42 having the appearance of a keyhole are located substantially centrally at increments above the cylindrical trough member 12. An elongated member 44, such as a tube or other suitable shape, is rotatably mounted in the end walls 18 and 20 by means of pins 46 in end plugs 48.

The height of the rotative member 44 may be adjusted by slightly lifting it so that the enlarged head of the pin 46 is aligned with the enlarged portion of the perforations 42. In this position a slight pressure outwardly on the end walls 18 and 20 makes possible removal of the elongated member 44 and insertion in others of the perforations 42 at a selected height above the cylindrical trough member 12.

In operation, the cylindrical side members 24 and 26 are adjusted and locked by bolt latches 40 in a set of perforations 38 at a selected height from the floor for a given size of poultry. The setting of the height of the cylindrical side members 24 automatically sets the capacity of the feeder trough to that which accommodates the particular size of poultry. After the cylindrical side members 24 have been adjusted to the proper height, the elongated member 24 is adjusted also to a corresponding height above the trough member 12 such that poultry of the size selected can not get into the trough. Since the elongated member 44 is rotatably mounted in the end walls 18 and 20, poultry which try to perch upon the elongated member 44 will cause it to rotate and thus unbalance the poultry and make them leave. It will be noted that the feeder 10 may be loaded from either side. Since the feeder is cylindrical in shape the food loaded in will tend to remain centrally of the feeder so as to be equally accessible to poultry from either side.

Fig. 4 shows an alternative construction of the present invention wherein a trough 50 in the form of a V may be used with sides 52 and 54 forming the arms of the V construction. Extending upwardly and outwardly and in extension of the sides 52 and 54 are side wall members 56 and 58 respectively with inwardly extending flanges 28 at their upper ends. The flanges 28 are slidably guided by the side arms of a V-shaped guide member 60. In this alternative embodiment the perforations 38 are in a straight line parallel to the respective side members 56 and 58. Except for these structural differences, the construction of this alternative embodiment shown in Fig. 4 is the same as that of the embodiment shown in Figs. 1, 2 and 3. Inasmuch as the side members 56 and 58 are straight rather than arcuate, movement of the side members 56 and 58 in extension of the sides 52 and 54 respectively will be along a substantially straight line parallel to the sides 52 and 54.

It should be understood that this invention is not limited to the exact details as shown and described as equivalents will suggest themselves to those skilled in the art. It is accordingly desired that the appended claims be given a broad interpretation commensurate with the scope of the invention within the art.

What I claim is:

1. A poultry feeder comprising, a trough member having two sides and two ends, an end plate fixed to each of said ends transversely to said trough, an elongated member mounted at its ends to rotate in said end plates above said trough, upwardly directed stationary guide members rigidly fixed to said end plates, a side-wall at each of said sides, said side walls being mounted to slide upwardly in said guide members in extension of said sides, and means for fixing said side-walls in place.

2. A poultry feeder comprising an open ended elongated shallow trough member of arcuate cross section, a transverse wall member fixed to each end of said trough closing said ends and supporting said trough, an arcuate guide member fixed to each of said wall members and in opposed relation to each other, an elongated side member of arcuate cross section at each side of said trough member, the diametral cross section of each of said side members being slightly smaller than that of the trough member and having its ends mounted on the respective adjacent guide members to slide circumferentially of said trough member, means for locking said side members in place, and an elongated element rotatably mounted at its ends in said wall members above said trough.

3. A poultry feeder comprising an elongated cylindrical trough member having two ends and two sides; an end wall fixed to each of said ends transversely to said trough member and having a first series of perforations at spaced intervals substantially centrally above said trough member and a second series of perforations at spaced intervals in substantially an arcuate extension of a cross section of said trough member in the direction of one side of said trough member and having a third series of perforations at spaced intervals in substantially an arcuate extension of a cross section of said trough member in the direction of the other side of said trough member; an arcuate guide member extending inwardly from each of said end walls, said guide members being oppositely disposed and having upwardly directed ends; an elongated member mounted at its ends to rotate in selected perforations of said first series; a cylindrical side wall at each of the sides of said trough and having end slots slideably fitted to said guide members thereby permitting extension and contraction of said side walls; and a bolt latch at each end of each of said side walls, said bolt latches being positioned to communicate with the respective second and third sets of perforations to thereby lock the side walls in place at selected increments of extension.

4. In a poultry feeder, a trough member having two sides and two ends, said sides extending outwardly and upwardly in angular relation to each other from a common juncture located substantially centrally of said sides, an end plate fixed to each of said ends and transversely to said trough, a side wall at each of said sides and mounted to slide in extension and contraction of said sides, and means for fixing said side walls in place.

5. In a poultry feeder, an elongated cylindrical trough member having two ends and two sides, an end wall fixed to each of said ends and transversely to said trough member and having a first series of perforations at spaced intervals substantially centrally above said trough member and a second series of perforations at spaced intervals in substantially an arcuate extension of a cross section of said trough member in the direction of one side of said trough member and having a third series of perforations at spaced intervals in substantially an arcuate extension of a cross section of said trough member in the direction of the other side of said trough member, an arcuate guide member extending inwardly from each of said end walls, said guide members being oppositely disposed and having upwardly directed ends, a cylindrical side plate at each of the sides of said trough and having end slots slideably fitted to said guide members thereby permitting extension and contraction of said sides of said trough, and a bolt latch at each end of each of said side plates, said bolt latches being positioned to communicate with the respective second and third sets of perforations to thereby lock the side plates in place at selected increments of extension.

References Cited in the file of this patent

UNITED STATES PATENTS

| | | | |
|---|---|---|---|
| 299,258 | Getten | Mar. 12, | 1889 |
| 1,081,235 | Iblings | Dec. 9, | 1913 |
| 1,096,753 | Richard | May 12, | 1914 |
| 2,136,587 | Gaskill | Nov. 15, | 1938 |
| 2,221,013 | White | Nov. 12, | 1940 |
| 2,361,598 | Calhoon | Oct. 31, | 1944 |
| 2,457,432 | Ballard | Dec. 28, | 1948 |
| 2,539,299 | Duhmert | Jan. 23, | 1951 |